US011591233B2

(12) United States Patent
Von Garnier et al.

(10) Patent No.: US 11,591,233 B2
(45) Date of Patent: Feb. 28, 2023

(54) PROCESS AND PLANT FOR THERMAL DECOMPOSITION OF ALUMINIUM CHLORIDE HYDRATE INTO ALUMINIUM OXIDE

(71) Applicant: METSO OUTOTEC FINLAND OY, Tampere (FI)

(72) Inventors: Agnes Von Garnier, Oberursel (DE); Linus Perander, Sandefjord (NO); Günter Schneider, Lorsch (DE); Peter Sturm, Karben (DE)

(73) Assignee: METSO OUTOTEC FINLAND OY, Tampere (FI)

( * ) Notice: Subject to any disclaimer, the term of this patent is extended or adjusted under 35 U.S.C. 154(b) by 0 days.

(21) Appl. No.: 17/542,779

(22) Filed: Dec. 6, 2021

(65) Prior Publication Data

US 2022/0177321 A1 Jun. 9, 2022

Related U.S. Application Data

(63) Continuation of application No. PCT/EP2019/065025, filed on Jun. 7, 2019.

(51) Int. Cl.
 *C01F 7/306* (2022.01)
 *B01J 8/38* (2006.01)
 *C01B 7/03* (2006.01)

(52) U.S. Cl.
 CPC ............. *C01F 7/306* (2013.01); *B01J 8/38* (2013.01); *C01B 7/035* (2013.01)

(58) Field of Classification Search
 CPC ............. C01F 7/306; B01J 8/38; C01B 7/035
 See application file for complete search history.

(56) References Cited

U.S. PATENT DOCUMENTS

| 4,080,437 A | * | 3/1978 | Reh | ............... B01J 8/26 |
| | | | | 432/15 |
| 4,091,085 A | * | 5/1978 | Reh | ............ C01F 7/306 |
| | | | | 432/15 |

(Continued)

FOREIGN PATENT DOCUMENTS

| AT | 315 207 B | 5/1974 |
| WO | 8304017 A1 | 11/1983 |
| WO | 2019114922 A1 | 6/2019 |

OTHER PUBLICATIONS

International Search Report issued by the European Patent Office acting as the International Searching Authority in relation to International Application No. PCT/EP2019/065025 dated Feb. 28, 2020 (3 pages).

(Continued)

*Primary Examiner* — Melissa S Swain
(74) *Attorney, Agent, or Firm* — Robert P. Michal

(57) ABSTRACT

The invention relates to a process and its relating plant for thermal conversion of aluminum chloride hydrate into aluminum oxide and gaseous hydrogen chloride. In a first step, aluminum chloride hydrate is fed into a decomposition reactor where it is heated to a temperature between 120 and 400° C. Afterwards, the partially decomposed aluminum chloride hydrate is finally calcined to aluminum oxide at a temperature between 850 and 1200° C. in a second reactor. The aluminum chloride hydrate is admixed with aluminum oxide in an intensive mixer with a mass ratio between 1:1 and 10:1 aluminum chloride hydrate to aluminum oxide for using a fluidized bed reactor as a decomposition reactor.

14 Claims, 1 Drawing Sheet

(56) References Cited

U.S. PATENT DOCUMENTS

| | | | | |
|---|---|---|---|---|
| 4,107,281 A | * | 8/1978 | Reh | C01F 7/306 |
| | | | | 432/15 |
| 4,226,844 A | * | 10/1980 | Reh | B01J 8/24 |
| | | | | 423/481 |
| 4,402,932 A | * | 9/1983 | Miller | C01F 7/306 |
| | | | | 423/481 |

OTHER PUBLICATIONS

Written Opinion of the International Searching Authority issued by the European Patent Office acting as the International Searching Authority in relation to International Application No. PCT/EP2019/065025 dated Feb. 28, 2020 (7 pages).

* cited by examiner

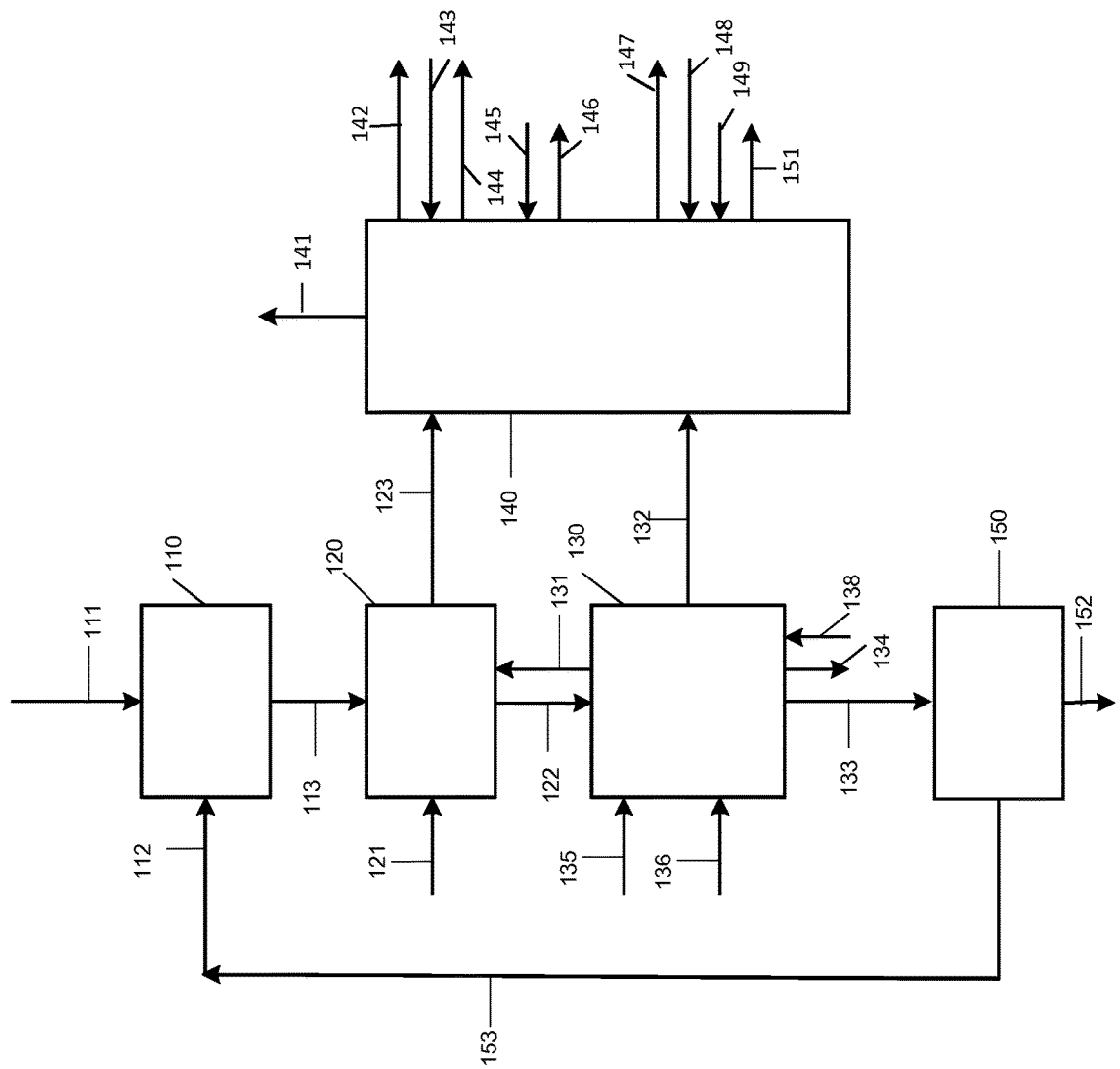

PROCESS AND PLANT FOR THERMAL DECOMPOSITION OF ALUMINIUM CHLORIDE HYDRATE INTO ALUMINIUM OXIDE

CROSS-REFERENCE TO RELATED APPLICATIONS

This application is a continuation of PCT International Application No. PCT/EP2019/065025 filed Jun. 7, 2019, the disclosure of this application is expressly incorporated herein by reference in its entirety.

The invention is directed to a process and its relating plant for thermal conversion of aluminum chloride hydrate into aluminum oxide and gaseous hydrogen chloride by partially decomposing the aluminum chloride hydrate in a decomposition reactor by heating to a temperature between 120 and 400° C. and then calcining the partially decomposed aluminum chloride hydrate in the calcining reactor to aluminum oxide at a temperature between 850 and 1200° C., Aluminum oxide, even with high purity, is often made from aluminum chloride hydrate.

In this reaction, aluminum chloride hydrate is allothermally heated in a rector such that the following decomposition reaction takes place:

$$AlCl_3 \cdot 6H_2O \rightarrow 0.5Al_2O_3 + 3HCl + 4.5H_2O$$

As a side product, a gas rich in HCl is produced while the aluminum chloride hydrate is at least partially decomposed in aluminum oxide. This aluminum oxide is often passed to a second reactor wherein at higher reaction temperatures calcination takes place as e.g. described in document WO 83/04017.

However, the two-step heating is a process with a high energy demand. Therefore, it is known from the state of the art, particularly documents AT 315 207 and PCT/EP2017/082226, to recycle hot product into the first decomposition step. Thereby the hot product is used as direct heat transfer medium and, thereby, recycle energy from the calcination into the decomposition.

However, such a mixing requires a very good heat and mass transfer. Moreover, good heat and mass transfer coefficients are also needed to reduce the amount of required energy.

On the other side, the number of reactor types which can be used for the process described above is very limited since the feed material, aluminum chloride hexahydrate (ACH) is per se a cohesive material known to be difficult to handle. Aluminum chloride hexahydrate is hygroscopic and tends to form agglomerates. This is even more the cases wherein it comes from the upstream process as small agglomerates. Also, it quickly starts decomposing at low temperatures and undergoes hydrolysis when in contact with humidity. Due to this reason it has been not possible to use reactor types with good heat and mass transfer coefficients, particularly it was not possible to use a fluidized bed reactor easily.

Therefore, it is the task underlying the invention to enable the use of a reactor with very good heat and mass transfer coefficients, particularly a fluidized bed Such a process for thermal conversion of aluminum chloride hydrate into aluminum oxide and gaseous hydrogen chloride features a first step of decomposing the aluminum chloride hydrate into a decomposition reactor by heating to a temperature between 120 and 400° C., preferably between 150 to 380° C. Most preferred is a range between 250 to 350° C. is preferred, since at a temperature around 350° C. the decomposition reaction is finished and (precalcined) alumina is obtained. Further heat treatment is preferred to happen in the second reactor to avoid increasing the heat input unnecessarily.

In a second step, the so-called calcining, the partially decomposed aluminum chloride hydrate is heated to a temperature between 850 and 1200° C. to form the desired product.

It is the essential idea underlying the invention that before the first step the aluminum chloride hydrate is admixed with aluminum oxide in an intensive mixer. The mass ratio between aluminum chloride hydrate and aluminum oxide lies between 1:1 and 10:1, preferably between 2:1 and 6:1, which is the range wherein the mixture is prevented from forming agglomerates. Afterwards, the resulting mixture is fed into the decomposition reactor which is preferably a fluidized bed reactor.

The mixer ensures a free-flowing, well conveyable and fluidizable solids feed stream. This is required since the ACH is expected to be received not in a free flowing form but as a sticky powder possibly containing smaller (<10 mm) or bigger agglomerates. Sufficient bulk flowability is essential to the whole process, and in particular to ensure a stable and controllable feeding to the plant and the treatment in the first reactor.

This is of particular importance for arrangements with a decomposition reactor designed as fluidized bed reactor, since otherwise no fluidized bed can be established.

In a preferred embodiment, at least parts of the aluminum oxide from the calcination are recirculated into the decomposition and/or the mixer. Thereby, it is possible to use the recycled material as a heat transfer medium, whereby it is possible to reduce the energy demand in the first decomposition step. Particularly preferred is an embodiment wherein this recycled product entering the decomposition or the mixer—typically with a temperature between 600 and 1100° C., preferably 700 and 1000° C. and most preferably 750 and 900° C.—is the only heat source and not external energy has to be used in the decomposition.

A mixing in the mixer has the advantage that the technical effect described with regard to claim 1, namely avoiding of agglomerations, is simultaneously achieved. However, in a mixing with hot material vapor with relatively high HCl content is formed. As a consequence, a hot mixing in the mixer requires an additional gas cleaning downstream the mixer or included therein.

Therefore, it is a possible alternative to recycle hot calcined material directly in the decomposition reactor while cold material is added in the mixer. This has the disadvantage that an additional recycling conduit is necessary, but the off-gas after treatment is omitted A possible source for the recycled material is a bin or any other kind of storage. Nevertheless, the added aluminum oxide preferably also comes from the process product and is withdrawn from the decomposition and/or the calcination. A recycling from the decomposition has the advantage that the product has a lower temperature and no extensive cooling is required for an adding in the mixture without any vapor formation. If aluminum oxide is recycled from the calcination, it is preferably recycled not directly, but from at least one cooling stage which is foreseen after the calcination.

In each case, the aluminum oxide added into the mixer features a temperature below 100° C., preferably between 0 and 60° C. and even more preferably below 40° C. at the entrance of the mixture. So, vapor formation is reliably avoided.

Aluminum chloride is produced by crystallization. To remove residual HCl after crystallization and further to reduce free surface moisture, dewatering and/or filtration and/or centrifugation is/are often foreseen. From this stage, bulk solids are transported to the process according to this invention, e.g. using chain or belt conveyor, bucket elevator or other means. If intermediate storage is used for the ACH feed, the risk of agglomeration is increased.

In another or complementary design, the aluminum chloride hydrate is passed through a lump breaker. So, a breakage of any lumps, preferably to averages diameter <30 mm is achieved in cases the feed contains bigger lumps. This means that the requirements for simultaneous comminution by the mixer can be reduced or become superfluous.

In this context, also a dryer can be foreseen to reduce the moisture content. In turn this reduces the tendency to agglomerate formation.

Typically, the calcination reactor is designed as a fluidized bed reactor, which leads to good heat and mass transfer. However, it is also possible to use a rotary kiln, which offers the benefit that it is cheap and easy to handle.

With regard to the use of fluidized bed reactors, it has to be pronounced that among the fluidized bed systems, annular fluidized bed systems and especially circulating fluidized bed systems lead to even better heat and mass transfer coefficients. Therefore, these are the most preferred reactor types.

Talking about fluidized bed, a number of fluidizing gases are possible. In principal, air is the cheapest and most readily available gas. Using steam as a fluidizing gas at least in the decomposition has the benefit that an over-azeotrope off-gas for (cheaper) acid recovery is achieved. However, if the after treatment of the acid uses a costlier pressure swing adsorption or wet scrubbing, the expensive supply of steam can be saved.

Moreover, a fuel can be added to the calcination to provide the necessary energy by internal combustion. If a gaseous fuel is used, it can be part of the fluidizing gas. If a combustion of fuel (gaseous or liquid) takes place within the calcination reactor, it is important to establish the required combustion conditions, by ensuring good solid mixing and secondary and/or tertiary air penetration up to the center of the reactor.

Talking about the off-gas treatment it is preferred that the off-gases, which typically contain at least 90 wt.-% of the produced hydrogen chloride are passed separately from the decomposition and the calcination to an off-gas treatment due to the different acid concentration.

Moreover, off-gases should preferably been quenched with water. Thereby, hydrochloric acid is produced which can be sold or used in another stage. The quench stage can be coupled to the calcination reactor.

In this context, a passing of the hydrochloric acid from the quenching to a leaching step is particularly effective, since such a leaching is typically done as a previous step to produce of aluminum chloride hydrate. Moreover, a (wet) scrubbing is possible.

In an alternative or supplemental embodiment, the off-gas treatment contains at least one absorption step as an effective gas-cleaning.

The mixing is preferably performed in a mixer with knifes and/or ploughshares and/or paddles. So, contained agglomerates are crushed with the knifes while the ploughshares or paddles ensure a complete mixing. Typical mixer types are a double shaft paddle mixer or a ploughshare mixer In a mixer containing knifes as well as ploughshares and/or paddles, it is preferred that the knifes rotate at least twice as fast as the ploughshares, preferred is more than five times faster, even more preferred is more than eight times faster, particularly preferred is more than ten times faster. This leads to an excellent mixing in combination with a sufficient crushing of the agglomerates.

Moreover, a retention time of at least one minute, preferably between 1 and 5 minutes, most preferably 1 and 3 minutes, in the mixer improves the results.

Such a plant for thermal conversion of aluminum chloride hydrate into aluminum oxide and gaseous hydrogen chloride comprises a decomposition reactor for decomposing the aluminum chloride hydrate and a calcination reactor. Both reactors are separated from each other. The essential part of the claimed plant is an intensive mixer which is foreseen upstream of the decomposition reactor. Therein, aluminum chloride hydrate is mixed with aluminum oxide, preferably with a mass ratio between 1:1 and 10:1 aluminum chloride hydrate to aluminum oxide. Moreover, the decomposition reactor is a fluidized bed reactor, which becomes possible due to the new plant arrangement, which prevents agglomeration reliably.

The decomposition reactor is designed such that it is able to heat the material to a first temperature while the calcination reactor is designed to heat the material to a second temperature being higher than the first temperature.

Any features described with respect to the plant may apply and/or be used in the process and vice versa. Naturally, the corresponding modifications and advantages apply accordingly.

Further aims, features, advantages and applications of the invention will become apparent from the following description of the accompanying drawings. All of the described and/or depicted features, by themselves or in any combinations, form the subject matter of the invention, independently of whether they are defined in the individual claims or their dependencies.

In the drawings:

FIG. 1 shows a process flow diagram of the method in accordance with the Invention.

FIG. 1 shows the principal design underlying the invention. Wet aluminium chloride hydrate is passed via conduit 111 into the mixer 110, where it is intensely mixed with aluminium oxide, which is introduce into the mixer 110 via conduit 112.

Afterwards the mixture of solids is passed through conduit 113 into a decomposition reactor 120, which is designed as a fluidized bed reactor. Further, its fluidization gas, preferably steam, is introduced via conduit 121.

The produced rich HCl gas, typically but not necessarily with an HCl content of above 30 vol.-% is passed via conduit 123 in an HCl absorption 140. This absorption stage 140 features preferably at least two stages, whereby conduit 123 is preferably connected to its first stage.

Via conduit 122, a product stream of the decomposition reactor 120, typically containing a mixture of already calcined $Al_2O_3$ and $AlCl_6 \cdot 6H_2O$, is passed into calcination reactor 130. Therein, often a gaseous fuel and/or liquid fuel is introduced via conduit 136 as energy source. Conduit 135 feeds an oxygen source into the calcination reactor 120. Via conduit 137, quench water is added. Via conduit 134 and 138, a cooling medium, preferably water, is recirculated in and out of the calcination reactor 130. The final calcined product $Al_2O_3$ is withdrawn via conduit 133 and further passed into at least one cooling stage 150 and further discharged via conduit 152.

Via conduit 132, a lean HCl gas, often but not limiting with an HCl content of less than 7 vol.-%. is passed into the HCl absorption 140, preferably its second stage.

If the absorption stage 140 is designed as a two-stage absorption, HCl solution withdrawn via conduit 141, while a first off-gas is withdrawn via conduit 142. Process water for the first stage is added via conduit 143 and withdrawn via conduit 144. Cooling water is injected by conduit 145 and withdrawn via conduit 146. From the second stage of the HCl absorption 140, an off-gas is withdrawn via conduit 147, while process water is added via conduit 148. Cooling water is recirculated via conduit 149 and 151.

For increasing energy efficiency, it is preferred that via conduit 131, parts from the calcination reactor 130 are passed into the decomposition reactor 120. Alternatively, but not shown, it is also possible to have only one withdrawing of $Al_2O_3$, from which a recycling stream into the decomposition reactor 120 is branched off.

In preferred embodiments of the invention, the aluminium oxide added into the mixer via conduit 112 is part of a product stream from a downward device. As one example amongst others, it is shown that parts of the product from the cooling stage 150 are withdrawn via a conduit 153 and fed into conduit 112.

Not shown in FIG. 1 but complementary or alternatively it is possible to withdrawn parts of the products form the decomposition reactor and/or the calcination reactor 130. It is also thinkable to have a branch-off in any conduit transporting an intermediate or the final product like conduit 122, conduit 131, conduit 133 and conduit 152. It is also possible to adjust the temperature of the recirculated stream by at least one additional and not shown cooler.

REFERENCE SIGNS

110 mixer
111-113 conduit
120 decomposition reactor
121-123 conduit
130 calcination reactor
131-138 conduit
140 absorption stage
141-149 conduit
150 cooling stage
151-153 conduit

The invention claimed is:

1. A process for thermal conversion of aluminum chloride hydrate into aluminum oxide and gaseous hydrogen chloride by partially decomposing the aluminum chloride hydrate in a decomposition reactor by heating to a temperature between 120 and 400° C. and then calcining the partially decomposed aluminum chloride hydrate in a calcining reactor to aluminum oxide at a temperature between 850 and 1200° C., wherein the aluminum chloride hydrate is admixed with aluminum oxide in a mixer with a mass ratio between 1:1 and 10:1 aluminum chloride hydrate to aluminum oxide and that the resulting mixture is fed into the decomposition reactor which is a fluidized bed reactor.

2. The process according to claim 1, wherein at least parts of the aluminum oxide from the calcination is recirculated in the decomposition reactor.

3. The process according to claim 2, wherein the recirculated aluminum oxide features a temperature between 600 and 1100° C. in the decomposition reactor.

4. The process according to claim 1, wherein at least parts of the aluminum oxide from the decomposition is recirculated in the decomposition reactor.

5. The process according to claim 4, wherein the recirculated aluminum oxide for the admixing in the mixer has a temperature below 100° C.

6. The process according to claim 1, wherein the aluminum chloride hydrate is passed through a lump breaker and/or a dryer before being fed into the mixer.

7. The process according to claim 1, wherein the calcination takes part in a fluidized bed/or a rotary kiln.

8. The process according to claim 1, wherein the decomposition and/or the calcination occur in a circulating fluidized bed.

9. The process according to claim 1, wherein steam and/or air is added to the decomposition and/or air and/or a fuel is added to the calcination.

10. The process according to claim 1, wherein off-gases are passed separately from the decomposition and the calcination to an off-gas treatment.

11. The process according to claim 10, wherein the off-gas treatment contains a quenching step and/or a scrubbing step and/or an absorption step.

12. The process according to claim 1, wherein the mixing is performed in the mixer with knifes and/or ploughshares and/or paddles.

13. The process according to claim 12, wherein the knifes rotate at least twice as fast as the ploughshares.

14. The process according to claim 1, wherein the residence time in the mixer is more than one minute.

\* \* \* \* \*